(12) United States Patent
Ogoro

(10) Patent No.: US 7,117,006 B2
(45) Date of Patent: Oct. 3, 2006

(54) PORTABLE CELLULAR PHONE SYSTEM WITH AUTOMATIC ANSWERING TELEPHONE FUNCTION

(75) Inventor: Kazuo Ogoro, Tokyo (JP)

(73) Assignee: NEC Corporation, Tokyo (JP)

( * ) Notice: Subject to any disclaimer, the term of this patent is extended or adjusted under 35 U.S.C. 154(b) by 659 days.

(21) Appl. No.: 09/969,995

(22) Filed: Oct. 4, 2001

(65) Prior Publication Data

US 2002/0042286 A1 Apr. 11, 2002

(30) Foreign Application Priority Data

Oct. 6, 2000 (JP) ............................. 2000-307777

(51) Int. Cl.
*H04B 1/02* (2006.01)
*H04B 1/04* (2006.01)
*H04B 7/02* (2006.01)
*H04M 1/00* (2006.01)
*H04M 1/725* (2006.01)

(52) U.S. Cl. ................ 455/550.1; 455/103; 455/412.1; 455/412.2; 455/413; 455/550; 455/552.1; 379/67.1; 379/68; 379/87; 379/88.22

(58) Field of Classification Search ............... 455/466, 455/412.1–412.2, 413, 414.1–414.4, 101–103, 455/552.1; 379/67.1, 68, 87, 88.22, 88.23, 379/88.25, 88.12

See application file for complete search history.

(56) References Cited

U.S. PATENT DOCUMENTS 5,487,069 A * 1/1996 O'Sullivan et al. ......... 370/404
5,864,762 A * 1/1999 Childress et al. ........... 455/509
6,564,071 B1 * 5/2003 Bergins et al. ............. 455/557
6,636,733 B1 * 10/2003 Helferich .................. 455/412.2
6,854,007 B1 * 2/2005 Hammond .................. 709/206

FOREIGN PATENT DOCUMENTS

| | | |
|---|---|---|
| EP | 0 862 282 A1 | 2/1998 |
| JP | 5-122757 | 5/1993 |
| JP | 8-126057 | 5/1996 |
| JP | 10-155037 | 6/1998 |
| JP | 11-122666 | 4/1999 |
| JP | 2000-13861 | 1/2000 |
| JP | 2000-125004 | 4/2000 |
| WO | WO 96/14718 | 5/1996 |

OTHER PUBLICATIONS

British Search Report dated Apr. 30, 2002.
Japanese Office Action dated Oct. 1, 2003 with Partial English Translation.
English translation of a Chinese Office Action dated Aug. 22, 2003.

* cited by examiner

*Primary Examiner*—Charles Appiah
*Assistant Examiner*—Michael Thier
(74) *Attorney, Agent, or Firm*—McGinn IP Law Group, PLLC

(57) ABSTRACT

A portable cellular phone system with an automatic answering telephone function can perform data communication and has automatic answering telephone functions installed on both the network side and a terminal unit side. This system includes a section for transferring a message recorded first by the automatic answering telephone function on the network side to the terminal unit side.

31 Claims, 3 Drawing Sheets

PORTABLE CELLULAR PHONE SYSTEM WITH AUTOMATIC ANSWERING TELEPHONE FUNCTION

BACKGROUND OF THE INVENTION

1. Field of the Invention

The present invention relates to a radio communication system using portable cellular phone sets and radio communication terminal units (to be simply referred to as a portable cellular phone system hereinafter) which can perform data communication and, more particularly, to a portable cellular phone system with an automatic answering telephone function.

2. Description of the Prior Art

In a portable cellular phone system, an automatic answering telephone function (to be simply referred to as an automatic answering function hereinafter) is used when a callee cannot answer the phone or is outside the radio zone. Such an automatic answering function is generally installed on a network for a portable cellular phone system and managed by the management company (to be referred to as an automatic answering telephone center hereinafter) of the portable cellular phone system. In addition, a similar function is implemented by a memory mounted in a user's phone set itself (this function will be referred to as a built-in automatic answering function hereinafter). The former function has not much limitation in terms of recording time, but a memory must always be prepared, resulting in an increase in facility/running cost on the management company side. In addition, the user must access the automatic answering telephone center to hear the voice (message) recorded in the automatic answering telephone center. In general, the user is charged for the fee for a telephone call for this purpose. The latter function has limitations in terms of recording time, but the user can repeatedly play back the recorded message.

Under the circumstances, both the automatic answering telephone center scheme and the built-in automatic answering function scheme are generally prepared to allow a user to select one or both of the schemes.

According to the automatic answering function in the conventional automatic answering telephone center, a message is recorded in the automatic answering telephone center installed on a network, and the message is made to play back by connecting a general voice communication channel between the automatic answering telephone center and the terminal. For this reason, under a condition of poor communication quality, voice is interrupted or mixed with noise, resulting in deterioration in the clarity. As a consequence, the user must repeatedly play back the message. Naturally, in this case, the fee for a telephone call increases from the viewpoint of the user, and the communication traffic increases from the viewpoint of the management company.

In the conventional built-in automatic answering function scheme, when a caller connects to the portable cellular phone set of the callee, the phone set automatically plays back an answering message to allow the caller to store his/her message in the memory in the phone set itself. In this case, since the caller pays the charge for the telephone call, the user is charged no fee. If, however, the message is recorded under a condition of poor communication quality, the voice is recorded with low clarity. In this case, since the user cannot make out the message even after repetitive playback, he/she must call back the person who has left the message to inquire it.

SUMMARY OF THE INVENTION

The present invention has been made to solve the above problems in the prior art, and has as it object to provide a portable cellular phone system with an automatic answering telephone function, which can ensure good voice quality even under a condition of poor communication quality of a channel between an automatic answering telephone center and a terminal unit without any deterioration in the clarity of the voice in the playback mode.

In order to achieve the above object, according to the basic aspect of the present invention, there is provided a portable cellular phone system with an automatic answering telephone function which can perform data communication and has automatic answering telephone functions installed on both a network side and a terminal unit side, comprising means for transferring a message recorded first by the automatic answering telephone function on the network side to the terminal unit side.

The portable cellular phone system with the automatic answering telephone function according to the present invention described in the basic aspect has the following subsidiary aspects.

When contents of the message recorded on the network side are to be transferred to the terminal unit side, a data communication function having means for improving reliability of the data, such as handshake, data retransmission, and error correction means, is used.

The network side comprises means for automatically sending out contents of the recorded message to the terminal unit side at a proper timing.

The terminal unit comprises means for automatically receiving recorded data of an automatic answering telephone without any operation by a user when the data is sent out from the network side.

The terminal unit comprises means for automatically identifying recorded data of an automatic answering telephone as recorded voice data of the automatic answering telephone and transferring the recorded data to a recording memory of the automatic answering telephone when the recorded data sent out from the network side is automatically received.

The terminal unit comprises means for reproducing the data transferred to a recording memory of the automatic answering telephone.

As is obvious from the above aspects, according to the present invention, the automatic answering telephone function incorporated in a radio communication terminal unit such as a portable cellular phone set is improved so that after voice from the other party is recorded by using the automatic answering telephone function on the network side, the recorded voice data is sent out to the terminal unit of the user in the form of digital data by using the data communication function. The terminal unit automatically receives the data and stores it in the automatic recording memory. This allows the user to play back the voice data stored in the memory by using the terminal unit.

Even under a poor radio wave condition during movement, the user can reliably and properly receive data owing to the handshake function and data correction function in retransmission of data through a data communication line. This allows the user to hear an automatically recorded message with good sound quality regardless of the communication condition on the user side.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

A preferred embodiment of the present invention will be described in detail below with reference to the accompanying drawings.

Figure 1:
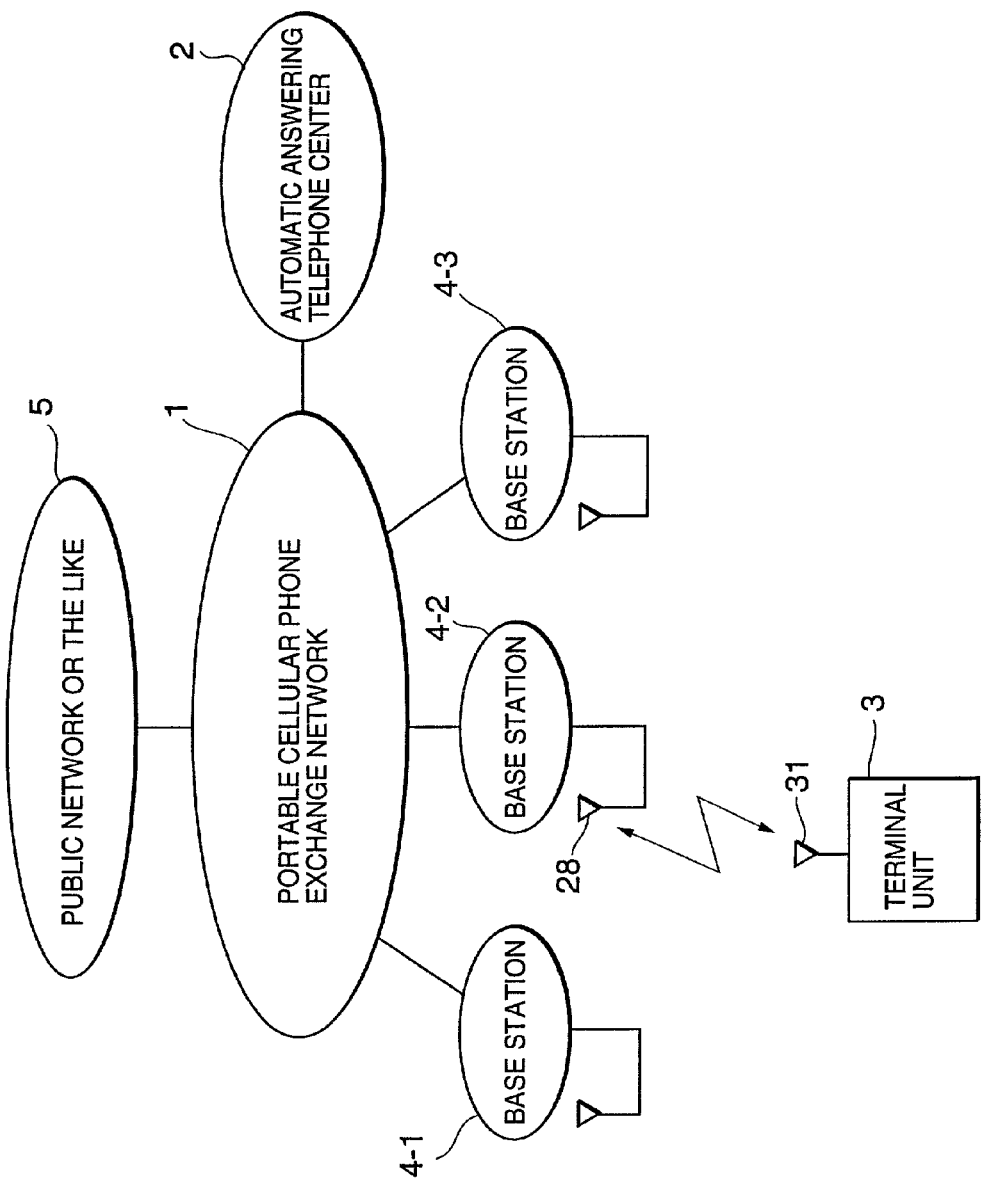
FIG. 1 is a block diagram schematically showing the overall arrangement of a portable cellular phone system with an automatic answering telephone function according to an embodiment of the present invention.
Figure 2:
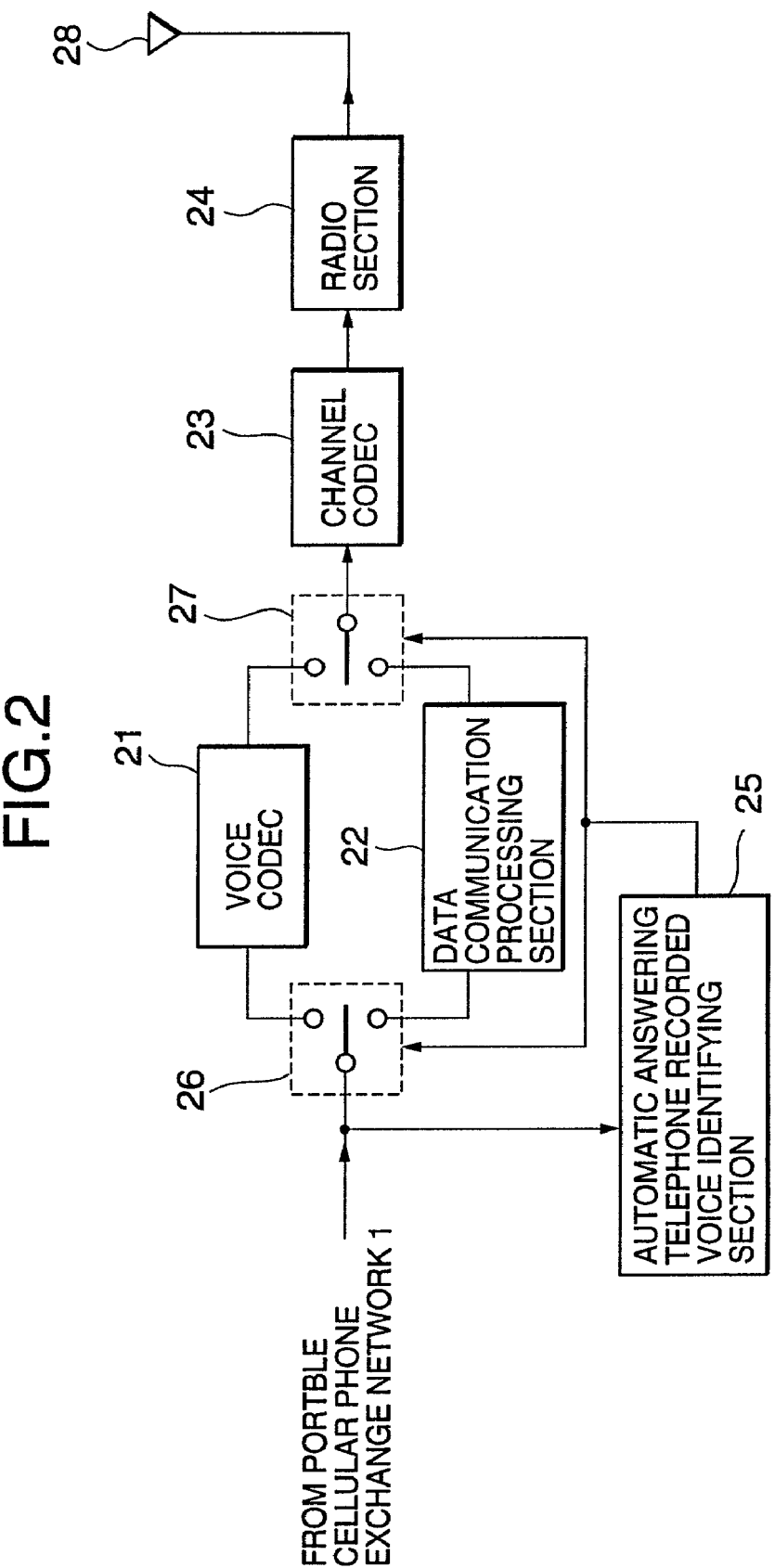
FIG. 2 is a block diagram showing the arrangement of the main part of each base station in FIG. 1.
Figure 3:
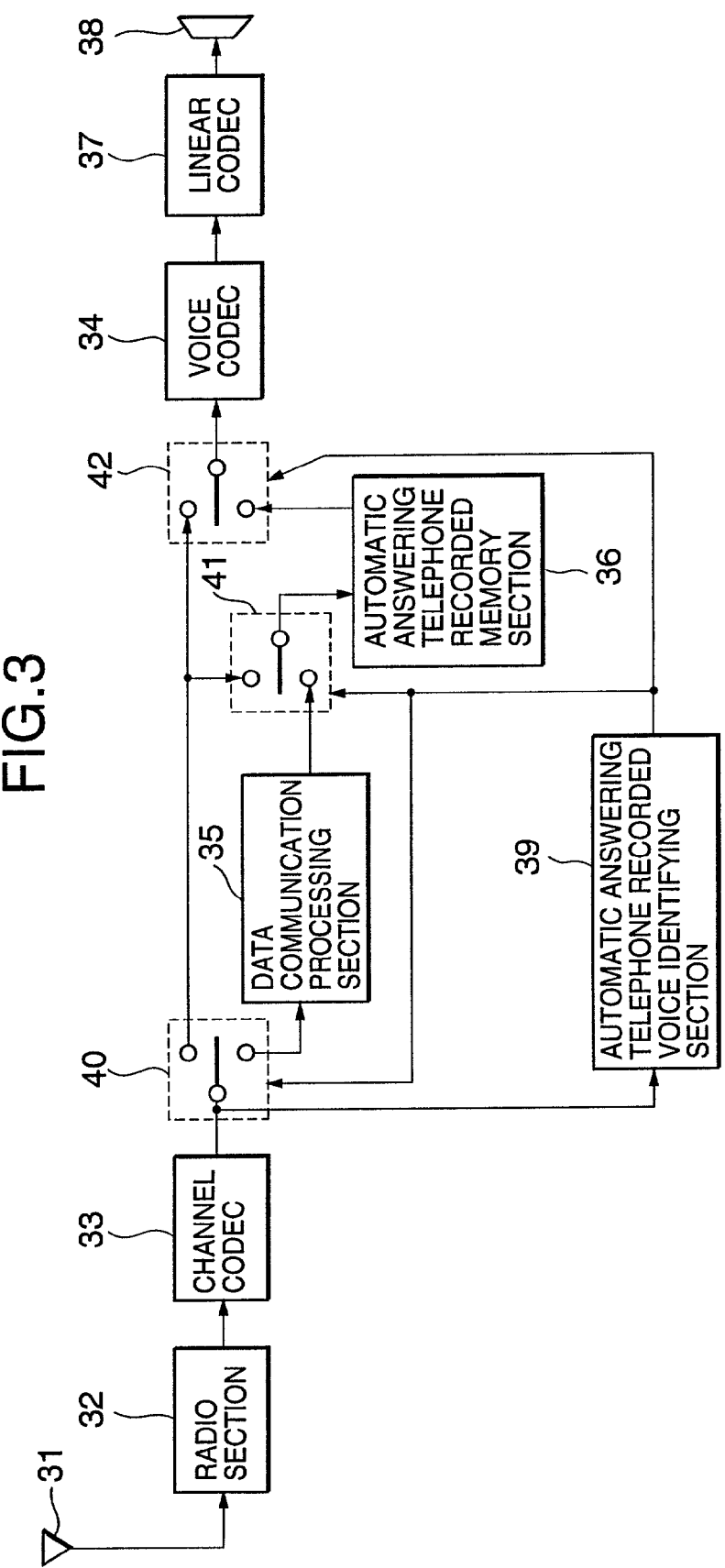
FIG. 3 is a block diagram showing the arrangement of the main part of a terminal unit in FIG. 1.

FIG. 1 is a block diagram schematically showing the overall arrangement of a portable cellular phone system with an automatic answering telephone function. FIG. 2 is a block diagram showing the arrangement of a base station 4-2 in FIG. 1. FIG. 3 is a block diagram showing the arrangement of a terminal unit 3. In this case, the base station 4-2 in FIG. 2 operates for the terminal unit 3.

The portable cellular phone system in FIG. 1 is comprised of a portable cellular phone exchange network 1, an automatic answering telephone center 2, the terminal unit 3, and base stations 4-1, 4-2, and 4-3. The portable cellular phone exchange network 1 is constituted by a relay station or host base station for performing call communication and controlling it, a certification authority for authenticating a terminal and performing charging processing, and the like. The portable cellular phone exchange network 1 is connected to a public network 5 or the like. The automatic answering telephone center 2 controls the automatic answering telephone function on the network side. The terminal unit 3 is radio communication terminal equipment such as a portable cellular phone or PHS. The base stations 4-1, 4-2, and 4-3 are end-use base stations for performing radio communication with the terminal unit 3.

As shown in FIG. 2, each of the base stations 4-1, 4-2, and 4-3 is comprised of a voice codec 21 for compressing/coding bearer voice data from the portable cellular phone exchange network 1, a data communication processing section 22 for handshaking with the other party in data communication, and performing error retransmission processing, correction processing, and the like, a channel codec 23 for transmitting the data according to a prescribed procedure, a radio section 24 for transmitting the data coded by the channel codec 23 by radio, an automatic answering telephone recorded voice identifying section 25 for switching signal paths upon determining whether input voice is automatically recorded voice, and switches 26 and 27. Although FIG. 2 shows only the transmitting section required for the description of the present invention, the actual base station also includes a receiving section.

As shown in FIG. 3, the terminal unit 3 is comprised of an antenna 31 and radio section 32 which receive radio signals from the base stations 4-1, 4-2, and 4-3, a channel codec 33 for extracting necessary data from bearer data from the radio section 32, a voice codec 34 for decompressing/decoding voice data output from the channel codec 33, a data communication processing section 35 for controlling data processing for data output from the channel codec 33, an automatic answering telephone recording memory section 36 for storing voice data by using an automatic answering telephone function, a linear codec 37 for converting the decoded voice data into an analog signal, a receiver section 38 for converting the analog signal into a sound wave, an automatic answering telephone recorded voice identifying section 39 for switching signal paths upon determining whether input voice is an automatic answering telephone recorded voice, and switches 40, 41, and 42. Although FIG. 3 shows only the receiving section necessary for the description of the present invention, the actual terminal unit also includes a transmitting section.

Although the data communication processing section are described as a hardware block in FIGS. 2 and 3, this section can be implemented by software.

Likewise, the automatic answering telephone voice identifying section 39 can be implemented by software.

The operation of this embodiment will be described next.

Referring to FIG. 1, if the terminal unit 3 receives an incoming call from another portable cellular phone set or public network but the user cannot answer the phone, the portable cellular phone exchange network 1 calls the automatic answering telephone center 2 to record a message from the other party in the memory in the center.

The recorded message is transferred to the memory in the terminal unit 3 of the user in the following procedure. In this case, the transfer of the message is preferably performed immediately when the user is inside the service area (the terminal unit 3 is inside the management zone of the portable cellular phone exchange network 1 and can be called up) or as soon as the user enters the service area.

The automatic answering telephone center 2 plays back the recorded message upon addition of an identification code indicating automatic answering telephone recorded voice data and transmits it. Currently, digital data are generally transmitted between exchanges, and hence the above data are sent out as digital signals. However, data compression and the like are not performed in this transmission but are generally performed in a base station (to be described later). This is because the data compression scheme may change depending on an environment. For example, the PDC scheme generally used in Japan uses both a compression scheme called a full-rate scheme and a compression scheme called half-rate scheme capable of further compressing data by half at the expense of sound quality. Since these schemes are selected depending on whether base stations in the process of communication have available channels, compression should be performed in the base stations having such information.

The data of the play back message sent from the automatic answering telephone center 2 is sent to the base station 4-2 capable of communicating with the user through the portable cellular phone exchange network 1.

In the base station 4-2 (see FIG. 2) capable of communicating with the user, the data sent from the portable cellular phone exchange network 1 is input to the automatic answering telephone recorded voice identifying section 25, which detects, in turn, the identification code indicating that the data is automatic answering telephone recorded voice data, and therefore identifies it as automatic answering telephone recorded voice data. The automatic answering telephone recorded voice identifying section 25 by which the input voice has been identified as the automatic answering telephone recorded voice data, switches the switches 26 and 27, which are generally set on the voice codec 21 side, to the data communication processing section 22 side. The play back message sent from the exchange network 1 is input to the data communication processing section 22, which in turn performs processing for improving the reliability of the data, e.g., checksum or CRC processing, forming the data into packets, and outputs them to the channel codec 23. The channel codec 23 performs interleaving, scrambling, and the like for the input data to convert it into a data sequence defined by the system, and outputs it to the radio section 24. The radio section 24 performs radio modulation of the data input from the channel codec 23, and outputs the resultant data to an antenna 28. The antenna 28 converts the input radio signal into a radio wave and transmits it to the terminal unit 3.

In the terminal unit 3 (see FIG. 3), the antenna 31 converts the radio wave emitted from the antenna of the base station 4-2 into a radio signal and outputs it to the radio section 32. The radio section 32 demodulates the input radio signal input from the antenna 31 into bearer data, and outputs it to the channel codec 33. The channel codec 33 performs descrambling, deinterleaving, and the like for the bearer data input from the radio section 32, and outputs the resultant data. Part of the data output from the channel codec 33 is input to the automatically recorded voice identifying section 39. At this time, if the received data is a play back message of the automatic answering telephone recorded data, the automatic answering telephone recorded voice identifying section 39 identifies it as the automatic answering telephone recorded voice data. Upon reception of this data, the automatic answering telephone recorded voice identifying section 39 switches the switches 40 and 41 to the lower side in FIG. 3.

The data output from the channel codec 33 is also input to the data communication processing section 35 through the switch 40. Upon reception of this data, the data communication processing section 35 decodes the packet data and makes a check such as a checksum or CRC. Upon detecting an error in the transformer path for the data, the data communication processing section 35 requests the host base station of the exchange network 1 to retransmit the data, and repeats this operation until complete data is received. Upon reception of the complete data, the data communication processing section 35 outputs the data to the automatic answering telephone recording memory section 36 through the switch 41. The automatic answering telephone recording memory section 36 stores the input data in a semiconductor memory.

When the user is to play back the automatic answering telephone recorded voice data, he or she switches the switch 42 to the lower side, and the automatic answering telephone recording memory section 36 outputs the stored data to the voice codec 34. The voice codec 34 decompresses the input data, decodes it into PCM data, and outputs it to the linear codec 37. The linear codec 37 plays back the data from the voice codec 34 into an analog signal, and outputs it to the receiver section 38. The speaker of the receiver section 38 converts the analog signal input from the linear codec 37 into a sound wave and makes the user hear the voice.

In the portable cellular phone system according to this embodiment, when an incoming call is received after the user of a portable cellular phone set or the like sets it in an automatic answering telephone mode, the voice from the other party is recorded by using the automatic answering function on the network side. Thereafter, the data of the recorded voice is sent out to the terminal unit of the user in the form of digital data.

The terminal unit of the user automatically receives this data. Upon identifying the data as automatic answering telephone recorded voice data, the terminal unit automatically stores the data in the automatic answering telephone recording memory. When the user notices the message that is automatically recorded, he/she can play back the stored voice data.

Even if, therefore, the radio wave condition deteriorates during movement or the like, data can be reliably received by using the handshake function, e.g., retransmission of data through a data communication channel, and the data correction function. The user can therefore hear the automatic answering telephone recorded voice with good sound quality regardless of the communication condition on the user side.

In this scheme, if a data error has occurred, a delay is produced at the timing of retransmission of the data from the automatic answering telephone center to the terminal unit. Therefore, this scheme is not suitable for general voice communication demanding real-time communication, but can be applied to an automatic recording scheme as in the present invention because a slight time delay is allowed.

This scheme is difficult to implement in a portable cellular phone system using the first generation FM modulation because of the use of a data communication function. However, the scheme can be applied to portable cellular phone systems of the second or subsequent generations, e.g., the PDC, PHS, GSM, cdmaOne, and W-CDMA (IMT-2000) scheme.

What is claimed is:

1. A portable cellular phone system with an automatic answering telephone function which can perform data communication and has automatic answering telephone functions installed on both a network side and a terminal unit side, comprising a communications section that transfers a voice message recorded first by the automatic answering telephone function on the network side to the terminal unit side on a communications channel having a data reliability enhancement function, wherein said communication section comprises a switch that switches between a voice channel and said communications channel having the data reliability enhancement function based upon an identification of said voice message as having been recorded by the automatic answering telenhone function on the network side.

2. A system according to claim 1, wherein when contents of the message recorded on the network side are to be transferred to the terminal unit side, a data communication function having means for improving reliability of the data is used.

3. A system according to claim 1, wherein the network side comprises means for automatically sending out contents of the recorded message to the terminal unit side at a proper timing.

4. A system according to claim 2, wherein the network side comprises means for automatically sending our contents of the recorded message to the terminal unit side at a proper timing.

5. A system according to claim 2, wherein the terminal unit comprises means for automatically receiving automatic answering telephone recorded data without any operation by a user when the data is sent out from the network side.

6. A system according to claim 3, wherein the terminal unit comprises means for automatically receiving automatic answering telephone recorded data without any operation by a user when the data is sent out from the network side.

7. A system according to claim 4, wherein the terminal unit comprises means for automatically receiving automatic answering telephone recorded data without any operation by a user when the data is sent out from the network side.

8. A system according to claim 5, wherein the terminal unit comprises means for automatically identifying automatic answering telephone recorded data sent out from the network side as recorded voice data of an automatic answering telephone when the data is automatically received and transferring the data to an automatic answering telephone recording memory.

9. A system according to claim 6, wherein the terminal unit comprises means for automatically identifying automatic answering telephone recorded data sent out from the network side as recorded voice data of an automatic answering telephone when the data is automatically received and transferring the data to an automatic answering telephone recording memory.

10. A system according to claim 7, wherein the terminal unit comprises means for automatically identifying automatic answering telephone recorded data sent out from the network side as recorded voice data of an automatic answering telephone when the data is automatically received and transferring the data to an automatic answering telephone recording memory.

11. A system according to claim 8, wherein the terminal unit comprises means for reproducing the data transferred to the automatic answering telephone recording memory.

12. A system according to claim 9, wherein the terminal unit comprises means for reproducing the data transferred to the automatic answering telephone recording memory.

13. A system according to claim 10, wherein the terminal unit comprises means for reproducing the data transferred to the automatic answering telephone recording memory.

14. A portable cellular phone system comprising:
an automatic telephone answering center on a network side comprising a first voice recording memory that selectively communicates wit a terminal unit, wherein said system transfers a voice recording from said first voice recording memory to said terminal unit as voice data on a communications channel that includes a data reliability enhancement function, wherein said automatic telephone answering center comprises a first switch that switches between a voice channel and the communications channel that includes a data reliability enhancement function based upon an identification of said voice recording as having been recorded by the automatic telephone answering system on said network side.

15. The system of claim 14, wherein said terminal unit comprises a second voice recording memory for recording said voice data.

16. The system of claim 14, wherein said system further ensures the data reliability of the transfer of said voice data from said first voice recording memory to said second voice recording memory using a data communications channel.

17. The system of claim 16, wherein said system ensures reliability of the transfer of said voice data using at least one of handshaking, data retransmission, and error correction procedures on said data channel.

18. The system of claim 16, further comprising a base station comprising:
an automatic answering telephone recorded voice identifying section in selective communication with said automatic telephone answering center;
wherein said first switch is controlled by said automatic answering telephone recorded voice identifying section;
wherein said voice channel has an input in communication with said first switch; and
wherein said data channel has an input in communication with said first switch,
wherein said automatic answering telephone recorded voice identifying section determines whether a voice recording is being received from said automatic telephone answering center and that controls said first switch to place said data channel into communication with said automatic telephone answering center when a voice recording is being received and to output said voice data from said data channel.

19. The system of claim 18, wherein said automatic answering telephone recorded voice identifying section determines whether a voice recording is being received from said automatic telephone answering center based upon an identification code.

20. The system of claim 18, wherein said data channel comprises a transmission reliability component.

21. The system of claim 20, wherein said transmission reliability component performs at least one of an error detection and an error correction function.

22. The system of claim 18, wherein said base station further comprises:
a second switch in communication with outputs of said voice channel and said data channel; and
an antenna in communication with said second switch,
wherein, when said automatic answering telephone recorded voice identifying section determines that a voice recording is being received, said automatic answering telephone recorded voice identifying section controls said second switch to place said data channel into communication with said antenna to transmit said voice data.

23. The system of claim 14, wherein said terminal unit further comprises:
an automatic answering telephone recorded voice identifying section in selective communication with said automatic telephone answering center;
wherein said first switch is controlled by said automatic answering telephone recorded voice identifying section;
wherein said voice channel has an input in communication with said first switch; and
wherein said data channel has an input in communication with said first switch,
wherein said automatic answering telephone recorded voice identifying section determines whether voice data is being received from said automatic telephone answering center and that controls said first switch to place said data channel into communication with said automatic telephone answering center when voice data is being received.

24. The system of claim 23, wherein said automatic answering telephone recorded voice identifying section determines whether voice data is being received from said automatic telephone answering center based upon an identification code.

25. The system of claim 23, wherein said data channel comprises a transmission reliability component.

26. The system of claim 25, wherein said transmission reliability component performs at least one of an error detection and an error correction function.

27. The system of claim 23, wherein said terminal unit further comprises a second switch controlled by said automatic answering telephone recorded voice identifying section to place an output of said data channel into communication with said second voice recording memory when said voice data is being received.

28. The system of claim 27, wherein said terminal unit further comprises a third switch controlled by said automatic answering telephone recorded voice identifying section to place one of an output from said voice channel and said voice recording memory into communication with an output device.

29. A method of transmitting a voice message in a portable cellular phone system, the method comprising:

detecting a voice message as an automatically answered and recorded voice message;

switching from a voice channel to a data communications channel that includes a data reliability enhancement feature based upon an identification of said voice message as having been recorded by an automatic answering telephone function on a network side; and transmitting the voice message using said data communications channel.

30. The method of claim 29, wherein the voice channel comprises a voice codec.

31. The method of claim 29, wherein the data communications channel comprises a data communications system.

* * * * *